(12) United States Patent
Shima et al.

(10) Patent No.: US 7,444,370 B2
(45) Date of Patent: Oct. 28, 2008

(54) DEVICE PRESENTING INFORMATION ABOUT RESOURCE LOCATION OF DEVICE CONTROL SOFTWARE

(75) Inventors: Toshihiro Shima, Nagano-ken (JP); Kazuhito Gassho, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 939 days.

(21) Appl. No.: 10/612,887

(22) Filed: Jul. 3, 2003

(65) Prior Publication Data
US 2004/0167973 A1   Aug. 26, 2004

(30) Foreign Application Priority Data
Jul. 4, 2002   (JP)   ............... 2002-196360

(51) Int. Cl.
G06F 15/16   (2006.01)
G06F 15/00   (2006.01)
G06F 9/445   (2006.01)

(52) U.S. Cl. .............. 709/203; 358/1.15; 709/217; 709/219

(58) Field of Classification Search .......... 709/203, 709/208, 217–219, 227, 228; 717/171–178; 358/1.15
See application file for complete search history.

(56) References Cited

U.S. PATENT DOCUMENTS

| | | | | |
|---|---|---|---|---|
| 5,692,111 A | * | 11/1997 | Marbry et al. | ............. 358/1.15 |
| 5,699,495 A | * | 12/1997 | Snipp | ................. 358/1.15 |
| 6,094,679 A | * | 7/2000 | Teng et al. | .............. 709/220 |
| 6,496,824 B1 | * | 12/2002 | Wilf | .................... 707/10 |
| 6,606,669 B1 | * | 8/2003 | Nakagiri | .............. 719/327 |
| 6,694,354 B1 | * | 2/2004 | Elg | ...................... 709/217 |
| 6,959,437 B2 | * | 10/2005 | Schacht et al. | ......... 719/321 |
| 6,966,034 B2 | * | 11/2005 | Narin | ................... 715/744 |
| 7,100,160 B2 | * | 8/2006 | LeFevre et al. | ......... 718/100 |
| 7,148,987 B2 | * | 12/2006 | Nishio | ................. 358/1.15 |
| 7,165,109 B2 | * | 1/2007 | Chiloyan et al. | ........ 709/227 |
| 2003/0195951 A1 | * | 10/2003 | Wittel et al. | ........... 709/220 |

* cited by examiner

*Primary Examiner*—Glenton B. Burgess
*Assistant Examiner*—Brendan Y Higa
(74) *Attorney, Agent, or Firm*—Martine Penilla & Gencarella, LLP

(57) ABSTRACT

The invention enables to readily download device control software to control device.

Once receiving a request from a client PC through a HTTP communication module 10, a printer PT identifies an OS used by the client PC from an environment variable attached to the request through an OS identification module 11. A driver location search module 11 searches a location address of a printer driver corresponding to the identified OS from a driver location database 12. A HTML generation module 14 generates a Web page in which a link to this location address is described and then informs the client PC of it as response via the HTTP communication module 10.

4 Claims, 8 Drawing Sheets

Get /driver.cgi  HTTP/1.0

User-Agent: Browser1 (W_98)

Accept: text/html; */*

Host: www.***.co.jp

Fig.6

| PRINTER MODEL | OS TYPE | LOCATION ADDRESS |
|---|---|---|
| LP-1000 | W_95 | www.***.co.jp/driver/LP1000/w95.zip |
|  | W_98 | www.***.co.jp/driver/LP1000/w98.zip |
|  | W_NT | www.***.co.jp/driver/LP1000/wnt.zip |
| LP-2000 | W_95 | www.***.co.jp/driver/LP2000/w95.zip |
|  | W_98 | www.***.co.jp/driver/LP2000/w98.zip |
|  | W_NT | www.***.co.jp/driver/LP2000/wnt.zip |
|  |  |  |

DEVICE PRESENTING INFORMATION ABOUT RESOURCE LOCATION OF DEVICE CONTROL SOFTWARE

BACKGROUND OF THE INVENTION

1. Field of the Invention

This invention relates to a device used in connection with a network, in particular, to a technique to acquire and update device control software for controlling the device via the network.

2. Description of the Related Art

In the prior art, a user of a devices such as printers and routers, which are used in connection with a network, downloads a latest version of device driver, firmware or utility software (hereinafter, software for control devices including these software collectively referred to as "device control software") from a homepage of the device manufacturer. On the homepage, storage locations of device control software are shown based on a model name of device or an operating system (hereinafter referred to as "OS") to be applied.

However, the homepage of manufacturer may have a complicated link structure, and thus it may be difficult to find out the Web page in which the device control software can be downloaded. Furthermore, since the user must identify the OS used by the user and the model name of the device in order to download, it may be difficult for a beginner to identify the device control software to be downloaded.

SUMMARY OF THE INVENTION

The invention is made in view of these problems and addresses to enable the users to readily download device control software.

A device of the invention is exemplified below to solve at least part of the above problems. A first device of the invention, which is used in connection with a network, includes: a communication unit configured to communicate with a client via the network; an identification unit configured to input OS information representing an operating system installed in the client to identify a type of the operating system used in the client; a search unit configured to search a storage location on the network of device control software, which corresponds to the identified type of the operating system and controls the device, from a database in which specifications of operating systems and storage locations of device control software are recorded in association with each other; and an information unit configured to inform the client of the searched storage location of the device control software.

The device used in connection with the network includes as follows: image input-output devices such as printers, network displays, scanners and digital cameras; and network communication devices such as routers, hubs, modems and access points. The network may be wired or wireless. In order to use any of such devices through the client, the device control software for controlling the device must be installed in the client or the device itself. In most cases, the latest device control software is uploaded in the server on The Internet which is managed by the manufacturer of the device.

The device of the invention automatically identifies the OS used by the client through the above-mentioned identification unit, and then informs the client of the storage location of the device control software corresponding to the OS. Therefore, the user can readily download the device control software even if the user does not identify the OS installed in the client or does not know the storage location of the device control software.

In the device of the invention, the communication unit may communicate based on HTTP, and the information unit may generate and send to the client a markup language file including a link to the storage location of the device control software.

This configuration enables the user to readily acquire the device control software only by clicking the link included in the markup language file. Where the markup language includes languages such as SGML, XML, XHTML and HTML.

In the device of the invention, the communication unit may communicate based on HTTP, and the OS information may be described as environment variable in a HTTP request sent from the client.

When the device is accessed base on HTTP via the client, a Web browser installed in the client is typically used. Since the Web browser adds the information of the client's OS to the request on sending the request to the device, the device can use this information to identify the type of the OS.

In the device of the invention, it is possible to provide the database, which associates the types of the operating systems to the storage locations of the device control software, in a variety of locations. For example, it may be stored in the device or in a predetermined server connected to the network. In the latter case, it is possible to readily respond to the change of the storage location of the device control software by rewriting the database on the server. The database is preferably provided in the server managed by the manufacturer of the device since most of changes of storage location are performed by the manufacturer of the device.

In the case where the database is stored in the server, preferably, the storage locations in the database are also recorded in association with model information of devices and the search unit uses the model information of the device and the identified type of the operating system to search the storage location of the device control software.

The above-mentioned database can be described in XML to improve its versatility.

The invention may be configured as the device described below. A second device of the invention, which is used in connection with a network, includes: a storage unit configured to store an URL for download corresponding to a Web page which provides device control software to control the device on The Internet; a HTTP communication unit configured to generate a markup language file including a link to the URL for download and sending the markup language file back to a client through a HTTP response in response to a HTTP request from the client.

According to the second device, the user can send the HTTP request to the device itself to immediately know the URL for download.

In the second device, the storage unit may store an URL for update corresponding to a Web page which provides update information to update the URL for download, and the device may further include an update unit configured to acquire the update information from the Web page based on the URL for update and using the update information to update the URL for download.

This configuration enables the update of URL for download to be readily responded to.

The invention is not limited to the aspects of device described above and is possible to be configured in a variety of aspects. For example, it may be configured as a method for informing the client of the storage location on the network of device control software or as a computer program for performing such information. Such computer program may be recorded in a computer-readable recording medium. Such recording medium may include a variety of media such as flexible disk, CD-ROM, DVD, magneto-optics disk, IC card, hard disk and the like.

BRIEF DESCRIPTION OF THE DRAWINGS

FIG. 6 is a schematic that shows a driver location database 12 stored in a server SV.

DESCRIPTION OF THE PREFERRED EMBODIMENTS

Figure 1:
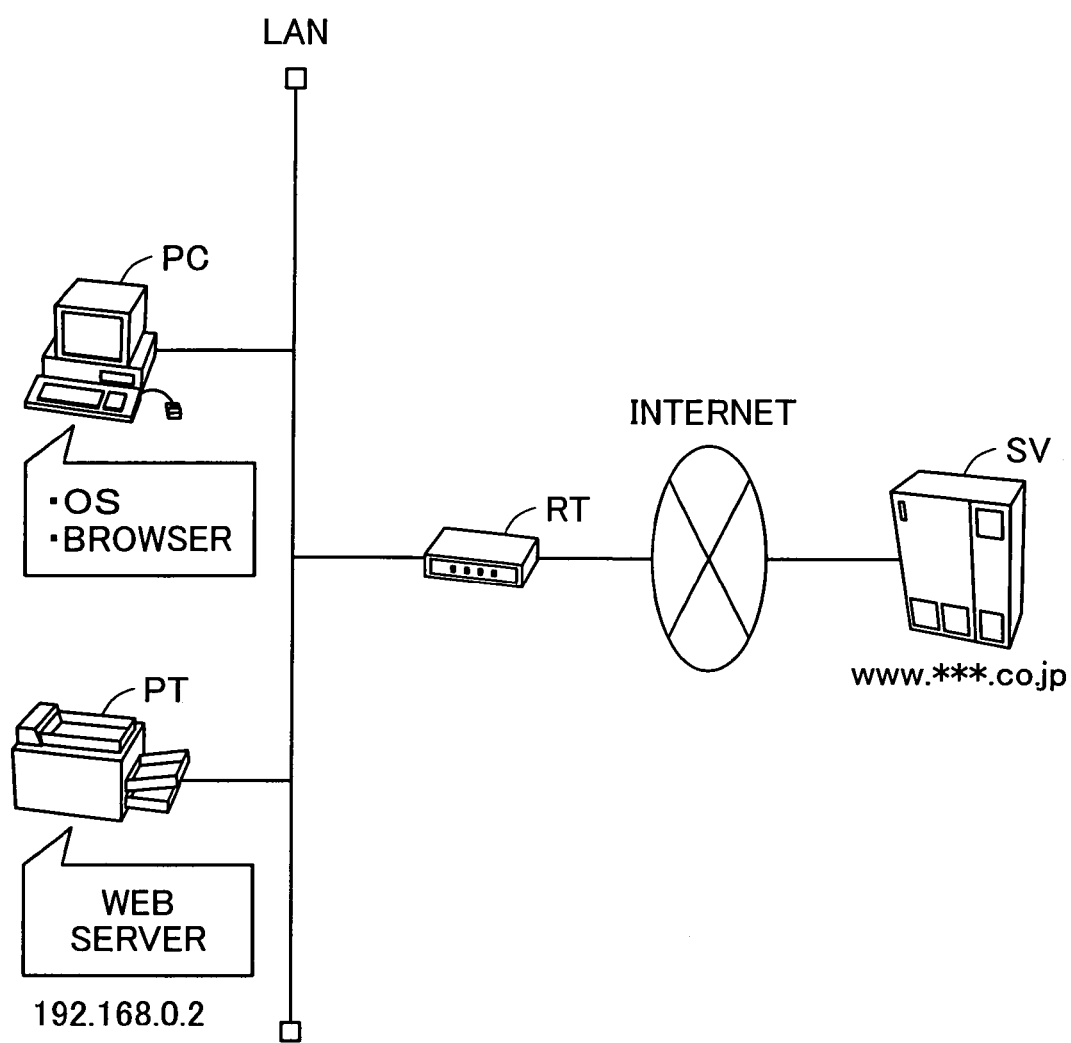
FIG. 1 is a schematic of a network configuration.

Embodiments of the invention are described in the following sequence.
A. General Description of Network
B. First Embodiment
  (B1) Configuration of Printer
  (B2) Process for Informing of Driver Location
C. Second Embodiment
  (C1) Process for Informing of Driver Location
D. Third Embodiment
  (D1) Configuration of Printer
  (D2) Process for Informing of Driver Location
A. General Description of Network FIG. 1 is a schematic of a network configuration that is used in a following embodiment. A client PC is a general-purpose personal computer in which an OS and a browser are installed. The browser is used to browse Web pages that are provided by a printer PT or a server SV. Although the only one client PC is shown, there may be a plurality of clients.

The printer PT is connected to the client PC via a LAN. The printer PT has a function of receiving a print job from the client PC and then printing, and a function as Web server. This Web server function enables the printer PT to present status information and setting information of the print job to the client PC. In this embodiment, an IP address of "192.168.0.2" is assumed to be assigned to the printer PT.

The LAN is connected to The Internet via a router RT. The router RT serves as firewall to prevent a device on The Internet from performing an unauthorized access to the LAN. The server SV is connected to The Internet. The server SV is managed by the manufacturer of the printer PT and supplies latest printer drivers. In this embodiment, an URL of the server SV is assumed to be "www.***.co.jp."

B. First Embodiment:
  (B1) Configuration of Printer:

The printer PT includes a CPU, a RAM and a ROM, and the ROM stores the programs for performing the function as a Web server and functions described below. The ROM also stores model information of the printer PT. The model information means a model name of the printer PT, for example, "LP-1000" or "LP-2000."

Figure 2:
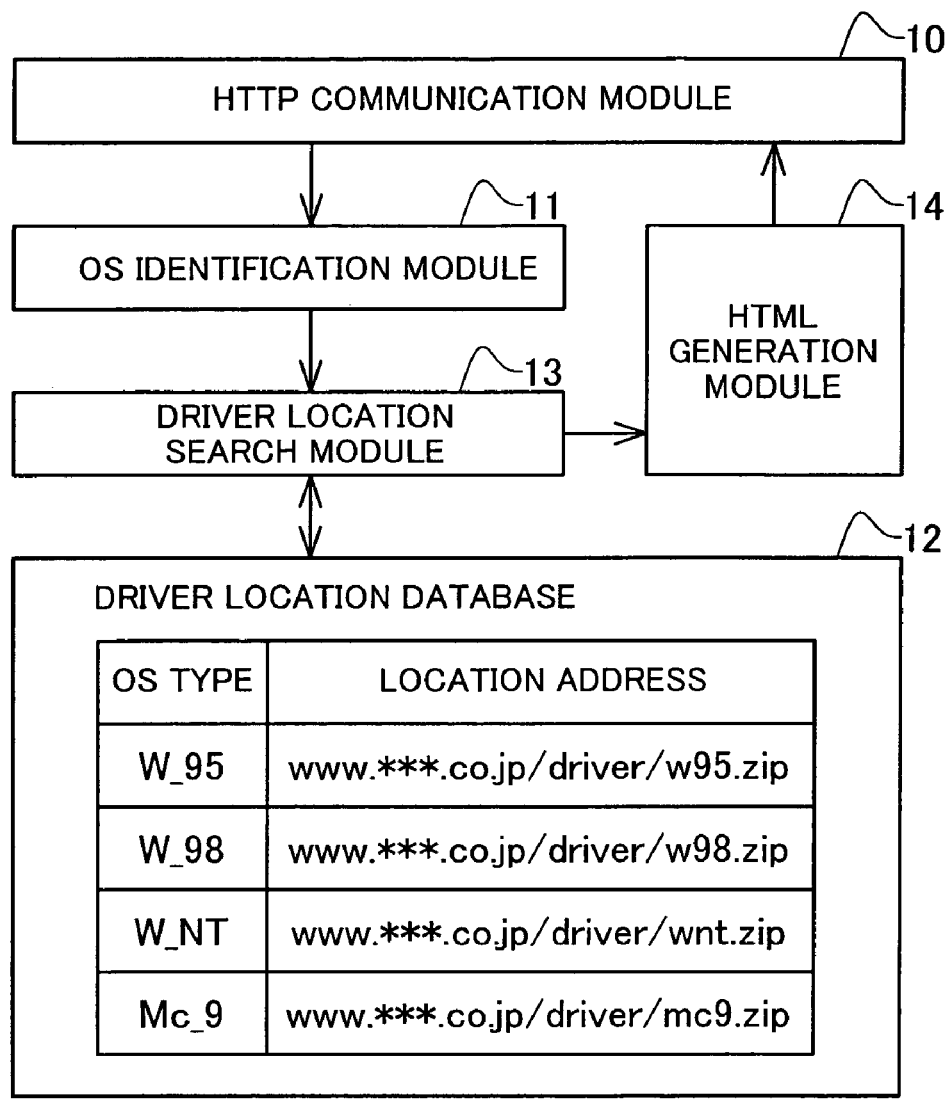
FIG. 2 is a schematic that shows functional blocks of a program stored in a ROM.

FIG. 2 is a schematic that shows functional blocks of the program stored in the ROM. A HTTP communication module 10 communicates with the client PC based on HTTP (Hyper Text Transport Protocol). A HTTP communication includes messages as follows: "request" for requesting transfer of document or execution of program; and "response" corresponding to the request. For example, if a request that requests transfer of a file "index.html" is sent to the printer PT from the browser, then the printer PT sends back the specified file as response. Furthermore, when an execution request is sent to the printer PT from the browser, the printer PT informs the browser of an execution result as response.

Figures 3, 4:
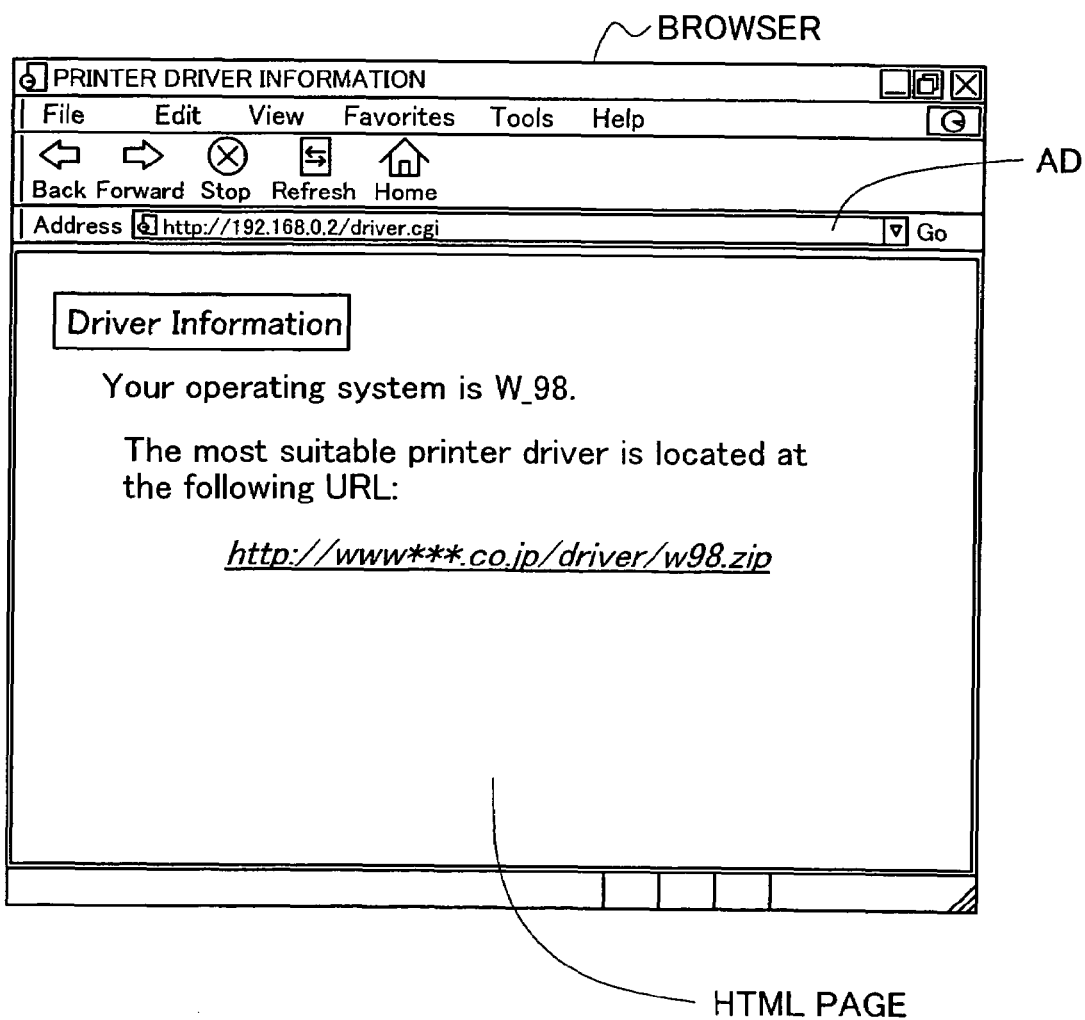
FIG. 3 is a schematic that shows one example of request.
FIG. 4 is a schematic that shows one example of HTML page sent to a browser.

The browser installed in the client PC attaches a variety of environment variables to the request and then sends it. FIG. 3 is a schematic that shows one example of request. FIG. 3 shows the request to request execution of a program "driver.cgi" stored in a root directory of a server which host name is "www.***.co.jp." The name of the OS and the browser that are used by the client PC are described in the environment variable shown as "User-Agent" in the request. FIG. 3 shows that the request has been sent by the browser "Browser1" running on the OS "W_98." An OS identification module 11 parses this environment variable to identify the type of the OS used by the client PC.

Recorded in a driver location database 12 are locations of printer drivers according to types of OS's. As shown in FIG. 2, for example, the printer driver corresponding to the OS "W_98" is stored in the URL "www.co.jp/driver/w98.zip." This database can be configured in the form of database described in XML, relational database or CSV format, for example. The database described in XML is relatively suitable for application on The Internet.

A driver location search module 13 searches the location of the printer driver corresponding to the OS identified by the above-mentioned OS identification module 11 from the driver location database 12.

A HTML generation module 14 generates a HTML page including the link to the searched location. The generated page is sent to the client as HTTP response. FIG. 4 is a schematic that shows one example of HTML page sent to the browser. The example shown in FIG. 4 displays the type of the OS (W_98) identified by the OS identification module 11 and the link to the URL (www.***.co.jp/driver/w98.zip) where the printer driver is stored. The user can click this link through a mouse operation to readily download the printer driver corresponding to the OS of the client PC.

Figure 5:
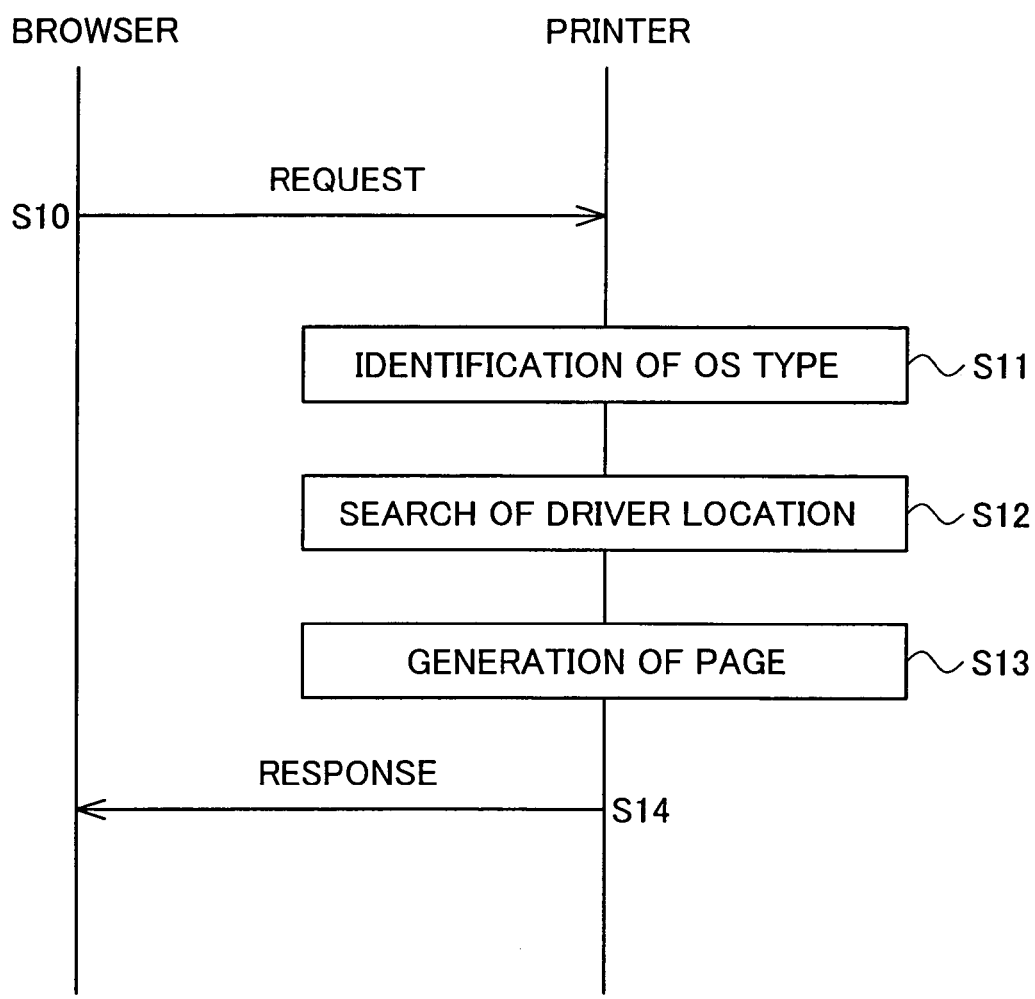
FIG. 5 is a flowchart that shows a process for informing a user of a driver location.

(B2) Process for Informing of Driver Location:

FIG. 5 is a flowchart that shows a process for informing a user of a driver location.

First, the user inputs the URL corresponding to the printer PT into an address bar AD of the browser (see FIG. 4). In the example of FIG. 4, "192.168.0.2/driver.cgi" is input. The browser sends a request to the printer PT based on this URL (step S10). Once receiving this request, the printer PT identifies the OS of the client PC from the environment variable attached to the request (step S1).

The driver location search module 13 searches the location of the driver corresponding to the identified OS from the driver location database 12 (step S12). Next, the HTML including the link to the searched location is generated (step S13) and then it is sent to the browser as HTTP response (step S14).

The above process enables the printer PT to inform the user of the location of the printer driver corresponding to the OS of the client PC.

C. Second Embodiment:

The driver location database 12 may be stored in the server SV, for example. FIG. 6 is a schematic that shows the driver location database 12 stored in the server SV. As shown in FIG. 6, this driver location database 12 stores addresses of locations of printer drivers according to model names of printer and types of OS.

Figure 7:
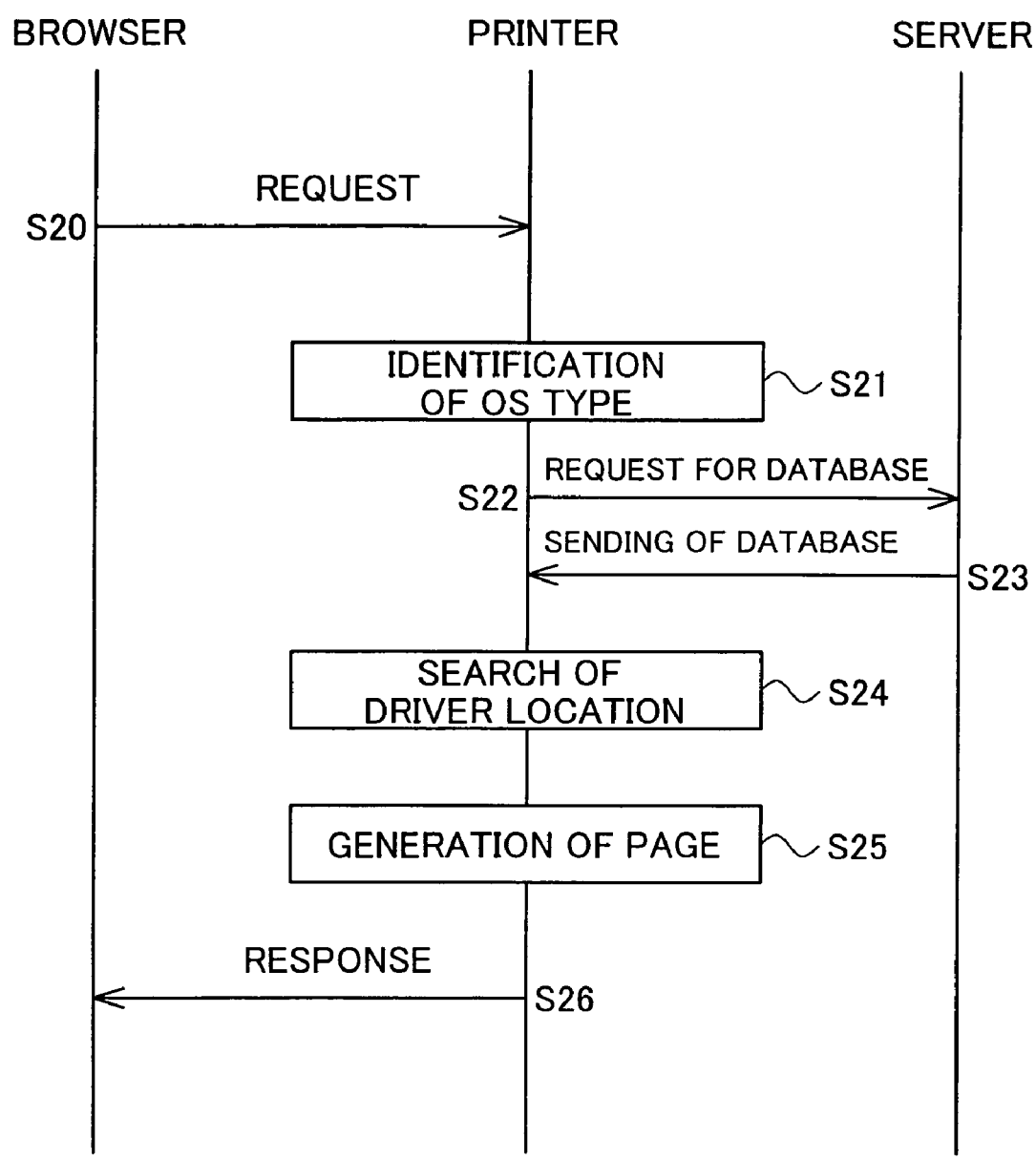
FIG. 7 is a flowchart that shows a process for informing a user of a driver location in the second embodiment.

(C1) Process for Informing of Driver Location:

FIG. 7 is a flowchart that shows a process for informing a user of a driver location in this embodiment.

The user inputs the URL corresponding to the printer PT into the address bar AD of the browser (see FIG. 4). The browser sends the request to the printer PT based on this URL (step S20). Once receiving this request, the printer PT identifies the type of the OS used by the client PC from the environment variable attached to the request (step S21).

Then, the printer PT requests the transmission of the driver location database 12 to the server SV (step S22). In response to this request, the server SV sends the driver location database 12 to the printer PT (step S23). Such communication preferably uses HTTP. Because HTTP enables to readily communicate over the firewall by the router RT.

Next, the printer PT searches the location of the printer driver corresponding to the identified OS and the model information of the printer PT from the acquired driver location database 12 (step S24). Subsequently, the HTML including the link to the searched location is generated (step S25) and then it is sent to the client PC as HTTP response (step S26).

The second embodiment described above enables the manufacturer of the printer to update the database accordingly since the database is stored in the server SV. Therefore, storage locations of drivers can be changed flexibly.

Figure 8:
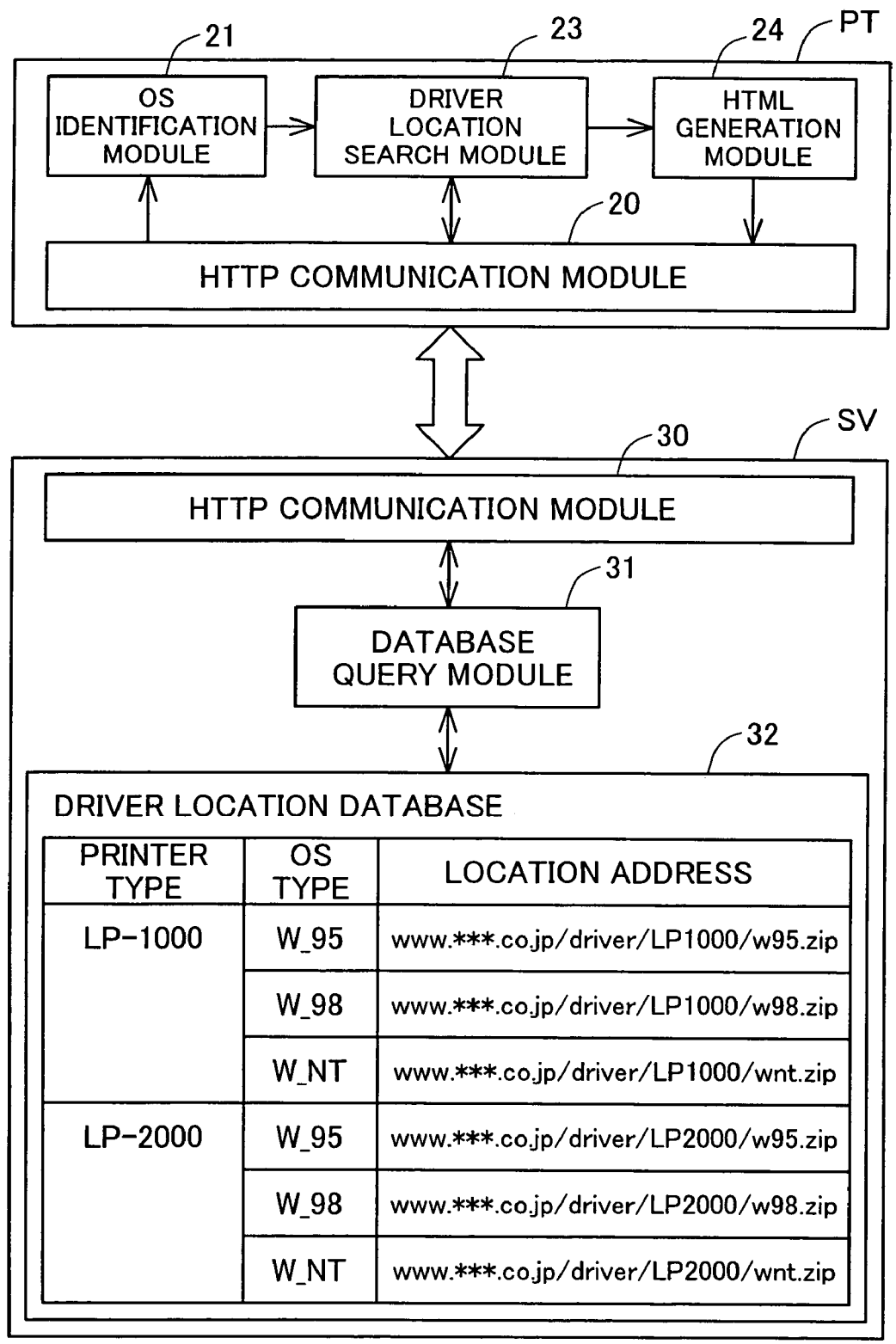
FIG. 8 is a block diagram of a printer PT and the server SV in the third embodiment.

D. Third Embodiment:

(D1) Configuration of Printer:

The location of the printer driver may be searched on the server SV side. FIG. 8 is a block diagram of the printer PT and the server SV in this embodiment.

The printer PT includes a HTTP communication module 20, an OS identification module 21, a driver location search module 23, and a HTML generation module 24. In this embodiment, the driver location search module 23 sends the type information of the OS identified by the OS identification module 21 and the model information stored in the ROM of the printer PT to the server SV, and thus causes the server SV to search the location of the driver.

The server SV includes a HTTP communication module 30, a database query module 31, and a driver location database 32. The database query module 31 searches the location of the printer driver from the driver location database 32 based on the type information of the OS and the model information of the printer PT that are received by the HTTP communication module 30. The HTTP communication module 30 informs the printer PT of the search result. Recorded in the driver location database 32 are data equal to that shown in FIG. 6.

Figure 9:
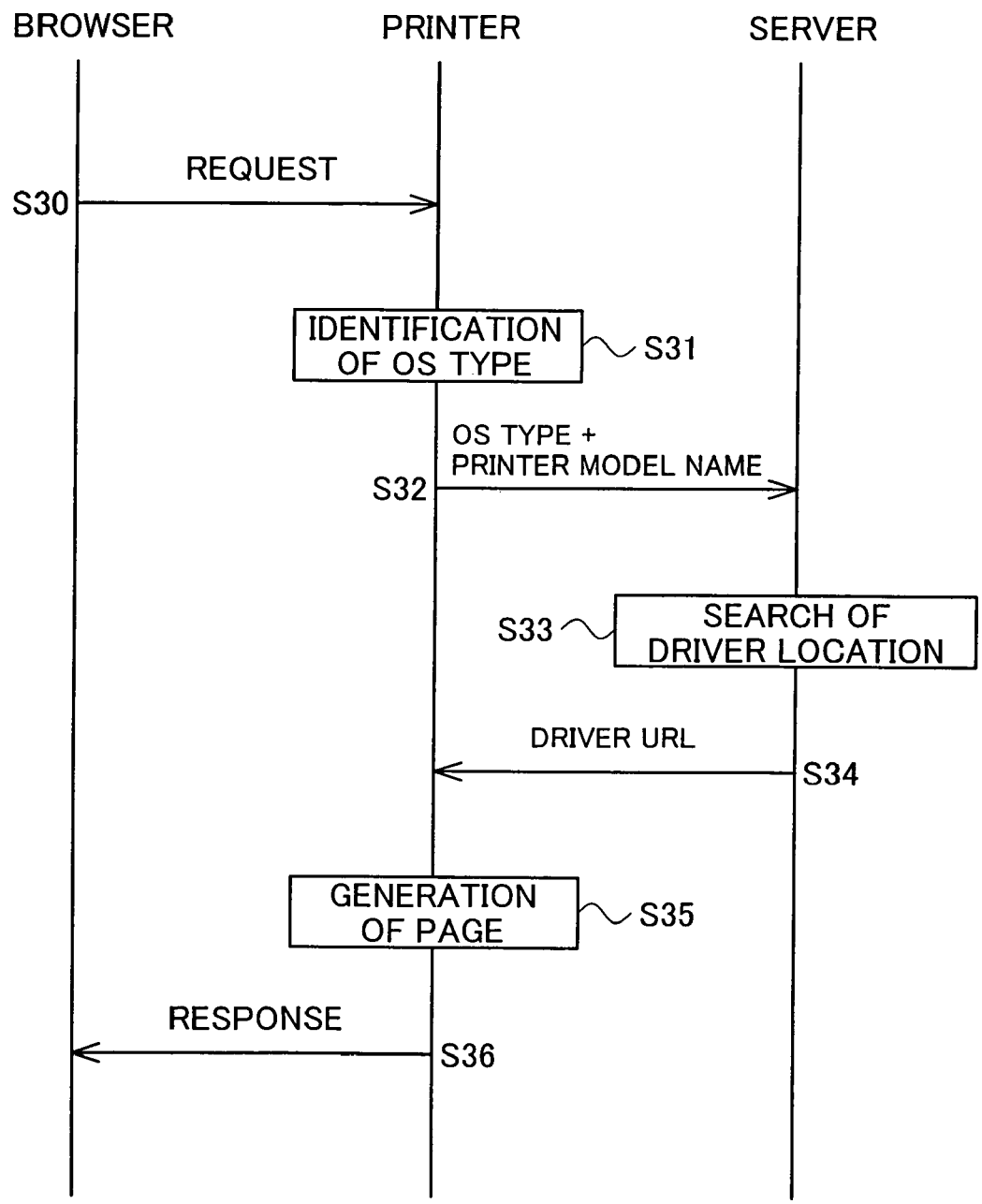
FIG. 9 is a flowchart that shows a process for informing a user of a driver location in the third embodiment.

(D2) Process for Informing of Driver Location:

FIG. 9 is a flowchart that shows a process for informing a user of a driver location in this embodiment.

First, the user inputs the URL corresponding to the printer PT into an address bar AD of the browser (see FIG. 4). The browser sends a request to the printer PT based on this URL (step S30). Once receiving this request, the printer PT identifies the OS of the client PC from the environment variable attached to the request (step S31).

Next, the driver search module specifies the model information of the printer PT read from the ROM and the OS name identified in the previous step as arguments to issue the request to the server SV (step S32). The server SV searches the location of the driver based on these arguments (step S33) and sends the result as response to the printer PT (step S34). The driver location search module delivers the received address of the driver location to the HTML generation module, and the HTML generation module generates the Web page (step S35) and informs the browser of the Web page as response (step S36).

The third embodiment described above enables the load on the printer PT to be reduced since the driver is searched on the server side.

Although the embodiments of the invention have been described, it should be noted that the invention is not limited to the above embodiments and may implement various aspects without departing from the spirit of the invention. For example, a matter realized in the form of software may be realized in the form of hardware. Furthermore, although the invention is applied to the printer in the embodiments, it may be applied to various devices such as routers, hubs and ADSL modems, which have a Web server function.

In the various embodiments described above, the location of the driver corresponding the OS of the client is searched from the database and then informed. Instead, the printer may previously store the URL of the Web page that provides the drivers, and thus the client may be informed of this URL. The Web page that provides drivers, for example, includes a Web page of the manufacturer for providing the drivers, a Web page where the drivers corresponding to the respective OS's are listed. Such aspect also enables the complication of the user searching the Web page for providing the drivers to be reduced. Meanwhile, if the URL stored in the printer can be updated, preferably, it is possible to flexibly respond to the change of the Web page location.

Furthermore, although the model information of the printer is also used to search the driver in the second and third embodiments described above, this is optional. For example, in the second embodiment, if the databases are provided for the respective printer models in the server SV and the printer PT is set to acquire its own database in advance, it is possible to search the driver corresponding to the OS of the client PC without using the model information of the printer. In the third embodiment, if the database query modules that differ by printer model are provided in the server SV and the printer PT specifies its own database query module, it is possible to search the driver corresponding to the OS of the client PC without using the model information of the printer.

What is claimed is:

1. A device used in connection with a network, said device comprising:

a communication unit that communicates with a client via said network based on HTTP;

an identification unit that inputs OS information representing an operating system installed in said client to identify a type of said operating system used in said client, said OS information being described in a User-Agent that is an environment variable in a HTTP request sent from said client;

a search unit that searches a storage location on said network of device control software, which corresponds to said identified type of said operating system and controls said device, from a database in which specifications of operating systems and storage locations of device control software are recorded in association with each other, said database being stored in a predetermined server connected to said device via said network; and an information unit that informs said client of said searched storage location of said device control software.

2. A device according to claim 1,
wherein said information unit generates and sends to said client a markup language file including a link to the storage location of said device control software.

3. A device according to claim 1,
wherein said storage locations in said database are also recorded in association with model information of devices, and said search unit uses the model information of said device and said identified type of said operating system to search the storage location of said device control software.

4. A device according to claim 1, wherein said database is described in XML.

* * * * *